US012467582B1

(12) United States Patent
Huang

(10) Patent No.: US 12,467,582 B1
(45) Date of Patent: Nov. 11, 2025

(54) FOLDING LAMP HOLDER FOR DECORATIVE LAMP

(71) Applicant: TAIZHOU CHAOLI LIGHTING CO.,LTD., Taizhou (CN)

(72) Inventor: Jun Huang, Taizhou (CN)

(73) Assignee: TAIZHOU CHAOLI LIGHTING CO.,LTD., Taizhou (CN)

(*) Notice: Subject to any disclaimer, the term of this patent is extended or adjusted under 35 U.S.C. 154(b) by 0 days.

(21) Appl. No.: 19/031,112

(22) Filed: Jan. 17, 2025

(30) Foreign Application Priority Data

Dec. 25, 2024 (CN) ........................ 202411925534.5

(51) Int. Cl.

| | |
|---|---|
| ***F16M 11/38*** | (2006.01) |
| ***F21V 1/06*** | (2006.01) |
| ***F21V 21/30*** | (2006.01) |
| *B65D 6/18* | (2006.01) |

(52) U.S. Cl.
CPC ............... *F16M 11/38* (2013.01); *F21V 1/06* (2013.01); *F21V 21/30* (2013.01); *B65D 7/26* (2013.01)

(58) Field of Classification Search
CPC ...... F21V 1/06; F21W 2121/00; F16M 11/38; B65D 7/26
See application file for complete search history.

(56) References Cited

U.S. PATENT DOCUMENTS 836,411 A * 11/1906 Stonebridge ............. F21V 1/06 362/162
931,954 A * 8/1909 McComas ................ B65D 7/26 220/6
963,769 A * 7/1910 Johnson ................... B65D 7/26 220/817
1,113,608 A * 10/1914 Franks ..................... B65D 7/26 220/6
1,499,665 A * 7/1924 Kaufman ................. B65D 7/26 220/6
1,537,617 A * 5/1925 Panther .................... B65D 7/26 220/6
1,972,483 A * 9/1934 Hartson ................... B65D 7/26 220/6
2,612,926 A * 10/1952 Di Mauro ................ B65D 7/26 220/9.2
6,135,617 A 10/2000 Lai
6,419,373 B1 7/2002 Shieh
(Continued)

FOREIGN PATENT DOCUMENTS

CN 202283223 U 6/2012
CN 103908076 B 6/2017
WO 2010139268 A1 12/2010

*Primary Examiner* — Alexander K Garlen
(74) *Attorney, Agent, or Firm* — Westbridge IP LLC

(57) ABSTRACT

A folding lamp holder for the decorative lamp includes a front frame, a rear frame, an upper frame and a side frame capable of being folded inward or outward. A plurality of first connecting sleeves are fixed on vertical beams on two sides of the front frame in a length direction of the vertical beam, a plurality of second connecting sleeves are fixed on vertical beams on two sides of the rear frame in a length direction of the vertical beam, a front end of the side frame penetrates through the first connecting sleeve to be rotatably connected to the front frame, a rear end of the side frame penetrates through the second connecting sleeve to be rotatably connected to the rear frame.

8 Claims, 6 Drawing Sheets

(56) References Cited

U.S. PATENT DOCUMENTS

| | | | |
|---|---|---|---|
| 6,663,259 | B2 | 12/2003 | Westfall |
| 7,160,000 | B2 | 1/2007 | Eldridge et al. |
| 7,635,064 | B2 | 12/2009 | Wang |
| 8,955,704 | B2 | 2/2015 | Kwon |
| 10,161,601 | B1 | 12/2018 | Chen |
| 2002/0126483 | A1 | 9/2002 | Tseng |
| 2004/0246725 | A1 | 12/2004 | Eldridge et al. |

* cited by examiner

FOLDING LAMP HOLDER FOR DECORATIVE LAMP

CROSS-REFERENCE TO RELATED APPLICATIONS

This application claims priority to Chinese Patent Application No. 202411925534.5, filed on Dec. 25, 2024, the content of which is incorporated herein by reference in its entirety.

TECHNICAL FIELD

The present application belongs to the technical field of decorative lamps, and relates to a folding lamp holder for a decorative lamp.

BACKGROUND

During Christmas, people like to decorate their rooms with Christmas decorative lamps, hang colored lamps on a Christmas tree, and place Christmas gift box decorative lamps under the Christmas tree, especially at night, a great decorative effect of the night lighting decorations is achieved, which brings people a cheerful and peaceful atmosphere. The Christmas gift box decorative lamps are mostly square, and may be stably placed on the ground and stacked. Such Christmas gift box decorative lamp has a simple structure, a lamp holder structure adopts a square frame made of plastic or iron, and the square frame is composed of a plurality of connecting rods. Decorations such as decorative ribbons, decorative ropes and colored paper may be wound or pasted on six surfaces and edges of the square frame, a lamp base is fixed inside the square frame, and lamp beads are mounted on the lamp base, or a lamp bulb string is directly wound on the square frame. Most of the existing lamp holders are non-detachable, and although the lamp holder has high firmness, the square frame cannot be folded or retracted, so that a large space is occupied, and the connecting rod is easily crushed and broken by a foreign object.

SUMMARY

Aiming at the above problem in the prior art, the present application is intended to provide a folding lamp holder for a decorative lamp, and the folding lamp holder for the decorative lamp after being folded facilitates transportation, reduces a storage space, and is convenient to mount.

The objective of the present application can be achieved by the following technical solution: a folding lamp holder for a decorative lamp comprises a front frame, a rear frame, an upper frame and a side frame capable of being folded inward or outward, wherein the front frame, the rear frame, the upper frame and the side frame are all composed of connecting rods with circular sections, the front frame, the rear frame and the upper frame are all rectangular, a plurality of first connecting sleeves are fixed on vertical beams on two sides of the front frame in a length direction of the vertical beam, a plurality of second connecting sleeves are fixed on vertical beams on two sides of the rear frame in a length direction of the vertical beam, a front end of the side frame penetrates through the first connecting sleeve to be rotatably connected to the front frame, a rear end of the side frame penetrates through the second connecting sleeve to be rotatably connected to the rear frame, a plurality of third connecting sleeves are fixed on an upper end cross beam of the rear frame in a length direction of the upper end cross beam, a cross beam of the upper frame penetrates through the first connecting sleeve to be rotatably connected to the rear frame, the upper frame is provided with a locking post, an upper end of the side frame is provided with a locking sleeve, and the locking post is capable of being inserted into the locking sleeve after the side frame is unfolded flat.

The folding lamp holder for the decorative lamp has a simple structure, the side frames on two sides only need to be bent outward or inward during transportation or storage, then the front frame and the rear frame are close to each other, and then the upper frame is turned outward to lean against the rear frame, so that the whole folding lamp holder for the decorative lamp is folded into a flat plate from an original cuboid, the folding lamp holder has a higher strength in a folded state, and the connecting rods are attached together, thus being not easy to be broken or damaged. When the decorative lamp needs to be mounted, the front frame and the rear frame are pulled open, and the side frame is naturally unfolded, after the side frame is pulled flat and straight, the upper frame is turned forward, so that the locking post on the upper frame is inserted into the locking sleeve of the side frame, and at this time, the folding lamp holder for the decorative lamp is transformed into a cuboid, then a decoration is wound or pasted on the connecting rod, and a lamp base is fixed in the lamp holder or a lamp string is wound on the connecting rod to complete mounting.

Further, the side frame comprises a rectangular front folding frame and a rectangular rear folding frame, a plurality of fourth connecting sleeves are fixed on the front folding frame in a length direction of a vertical beam, and a vertical beam of the rear folding frame penetrates through the fourth connecting sleeve to be rotatably connected to the front folding frame.

Further, the front folding frame and the rear folding frame have the same length and width.

Further, the locking sleeve is fixed on one side of the fourth connecting sleeve.

Further, the upper frame further comprises a cross-shaped reinforcing rib, four outer ends of the cross-shaped reinforcing rib are respectively connected with side beams of the upper frame, and the locking post is vertically fixed on the cross-shaped reinforcing rib.

Further, the front frame and the rear frame are fixed with straight-bar reinforcing ribs for connecting the side beams.

Further, the front frame, the rear frame and the upper frame have the same length and width.

Further, the connecting rod is a metal rod, and the first connecting sleeve, the second connecting sleeve, the third connecting sleeve, the fourth connecting sleeve, the locking post and the locking sleeve are all made of metal materials.

Further, the first connecting sleeve, the second connecting sleeve, the third connecting sleeve, the fourth connecting sleeve, the locking post and the locking sleeve are fixed on the connecting rods by welding.

Compared with the prior art, the folding lamp holder for the decorative lamp has the following advantages.

Firstly, the folding lamp holder for the decorative lamp has a simple structure, a light weight, a low cost and simple folding steps, may be quickly folded for storage and transportation, and occupies a small space.

Secondly, the mounting may be completed by only pulling the front frame and the rear frame open, and then inserting the locking post into the locking sleeve, so that the mounting is convenient, without needing mounting tools such as a screwdriver.

DETAILED DESCRIPTION OF THE EMBODIMENTS

Figure 1:
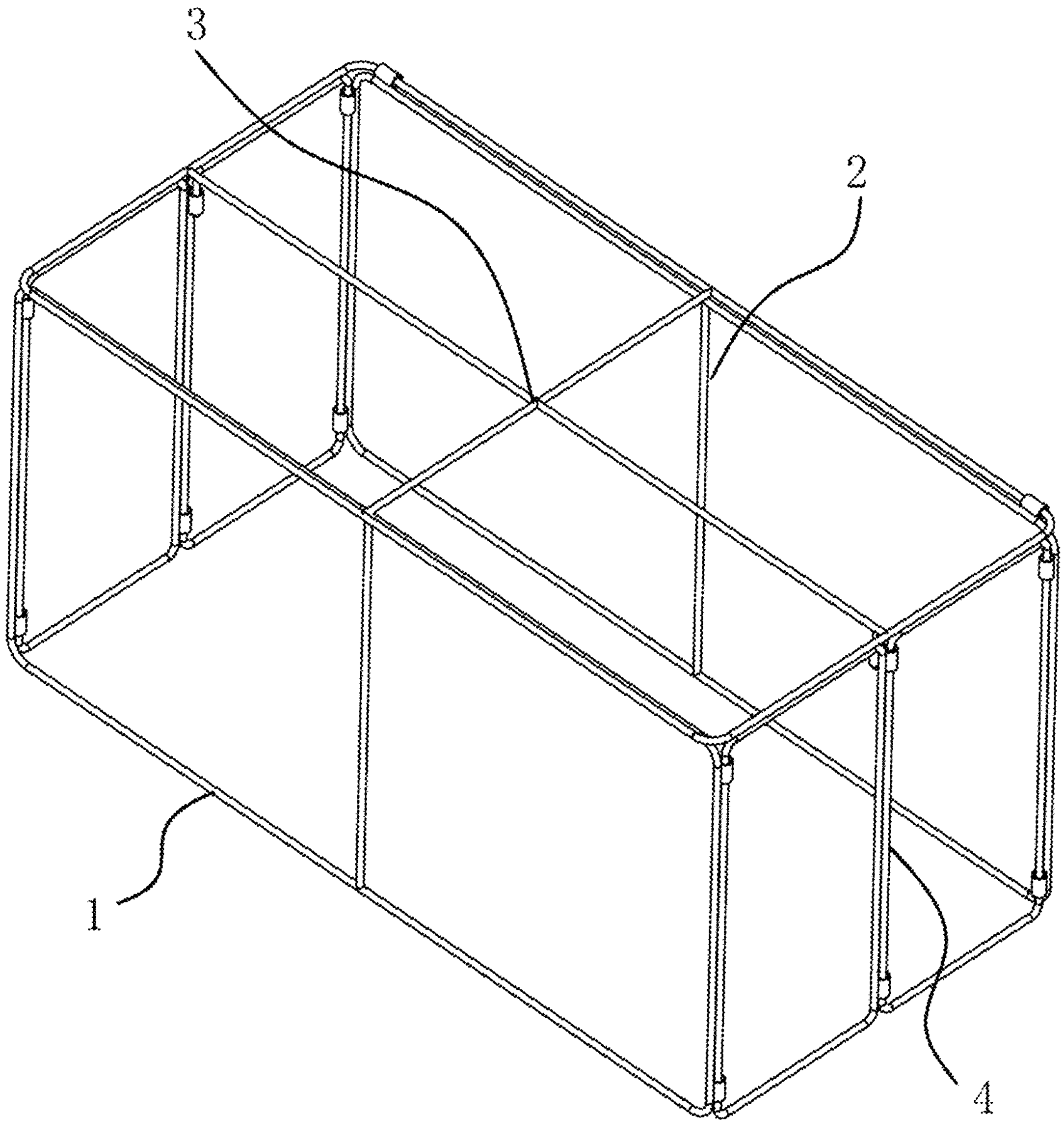
FIG. 1 is a structural diagram of a folding lamp holder for a decorative lamp.
Figure 2:
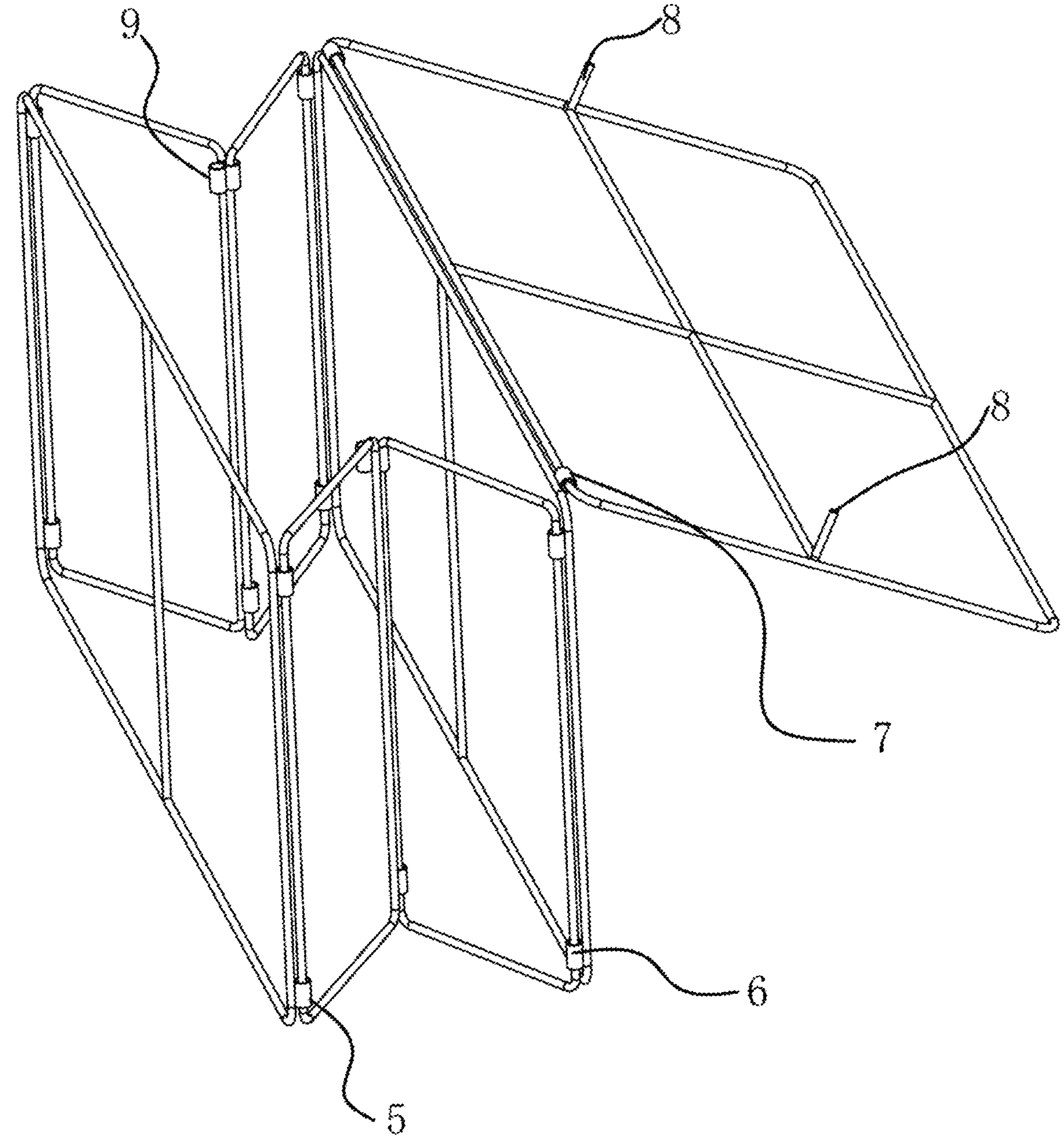
FIG. 2 is a structural diagram of the folding lamp holder for the decorative lamp in a folding process.
Figure 3:
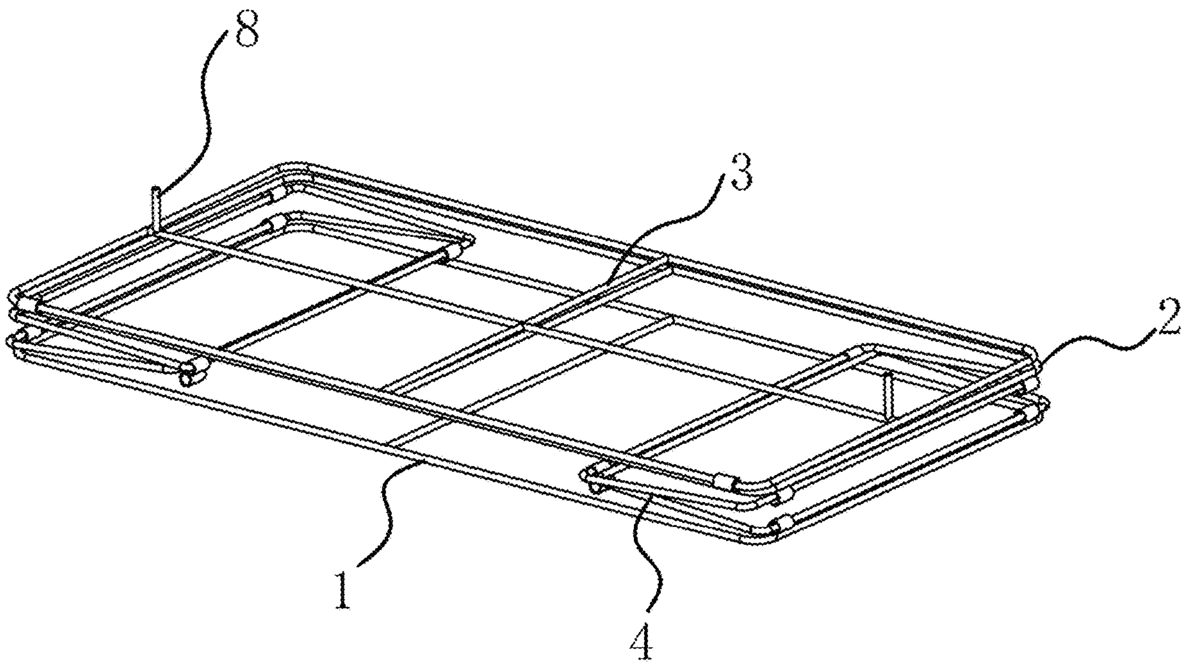
FIG. 3 is a structural diagram of the folding lamp holder for the decorative lamp after being completely folded.
Figure 4:
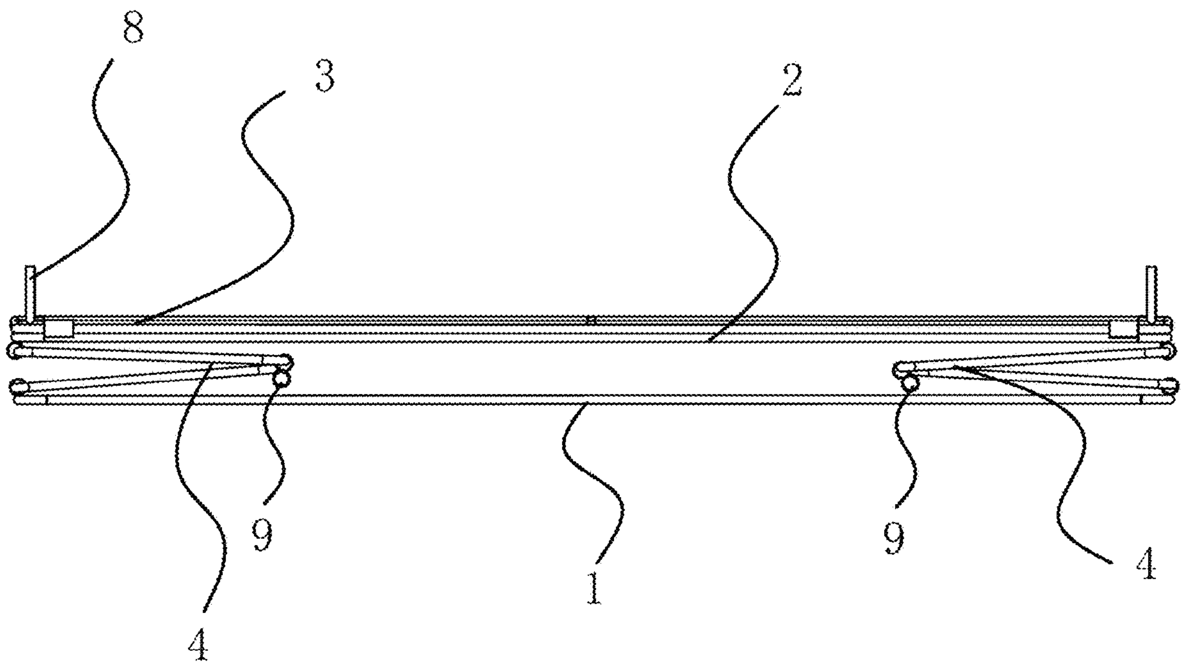
FIG. 4 is a side view of the folding lamp holder for the decorative lamp after being folded.

The following descriptions are specific embodiments of the present application, and with reference to the drawings, technical solutions of the present application are further described, but the present application is not limited to these embodiments.

As shown in FIG. 1 to FIG. 4, a folding lamp holder for a decorative lamp comprises a front frame 1, a rear frame 2, an upper frame 3 and a side frame 4 capable of being folded inward or outward, wherein the front frame 1, the rear frame 2, the upper frame 3 and the side frame 4 are all composed of connecting rods with circular sections, the front frame 1, the rear frame 2 and the upper frame 3 are all rectangular, a plurality of first connecting sleeves 5 are fixed on vertical beams on two sides of the front frame 1 in a length direction of the vertical beam, a plurality of second connecting sleeves 6 are fixed on vertical beams on two sides of the rear frame 2 in a length direction of the vertical beam, a front end of the side frame 4 penetrates through the first connecting sleeve 5 to be rotatably connected to the front frame 1, a rear end of the side frame 4 penetrates through the second connecting sleeve 6 to be rotatably connected to the rear frame 2, a plurality of third connecting sleeves 7 are fixed on an upper end cross beam of the rear frame 2 in a length direction of the upper end cross beam, a cross beam of the upper frame 3 penetrates through the first connecting sleeve 5 to be rotatably connected to the rear frame 2, the upper frame 3 is provided with a locking post 8, an upper end of the side frame 4 is provided with a locking sleeve 9, and the locking post 8 is capable of being inserted into the locking sleeve 9 after the side frame 4 is unfolded flat.

Figure 6:
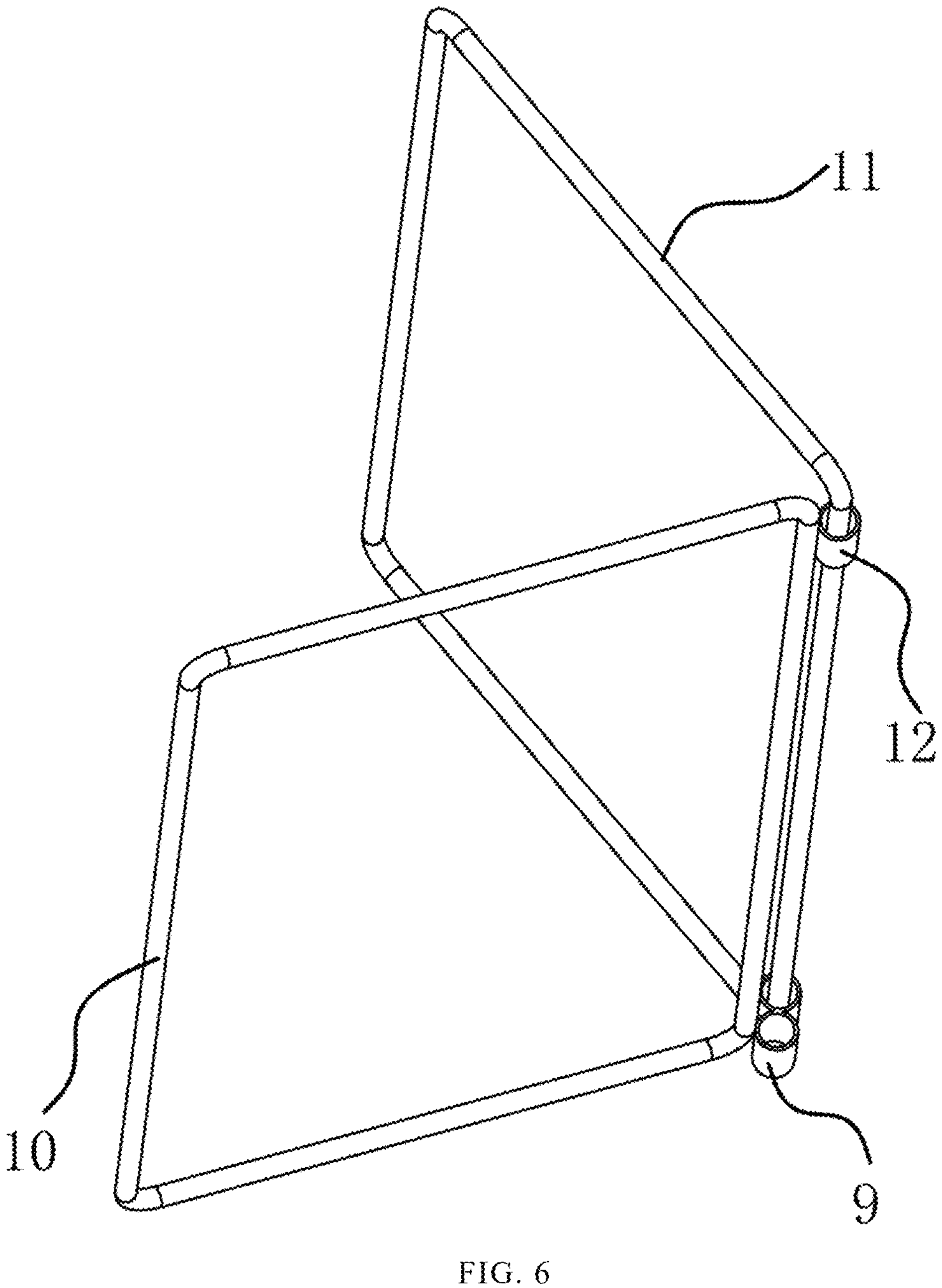
FIG. 6 is a schematic structural diagram of a side frame.

As shown in FIG. 6, the side frame 4 comprises a rectangular front folding frame 10 and a rectangular rear folding frame 11, a plurality of fourth connecting sleeves 12 are fixed on the front folding frame 10 in a length direction of a vertical beam, and a vertical beam of the rear folding frame 11 penetrates through the fourth connecting sleeve 12 to be rotatably connected to the front folding frame 10. The locking sleeve 9 is fixed on one side of the fourth connecting sleeve 12, and the front folding frame 10 and the rear folding frame 11 have the same length and width.

Figure 5:
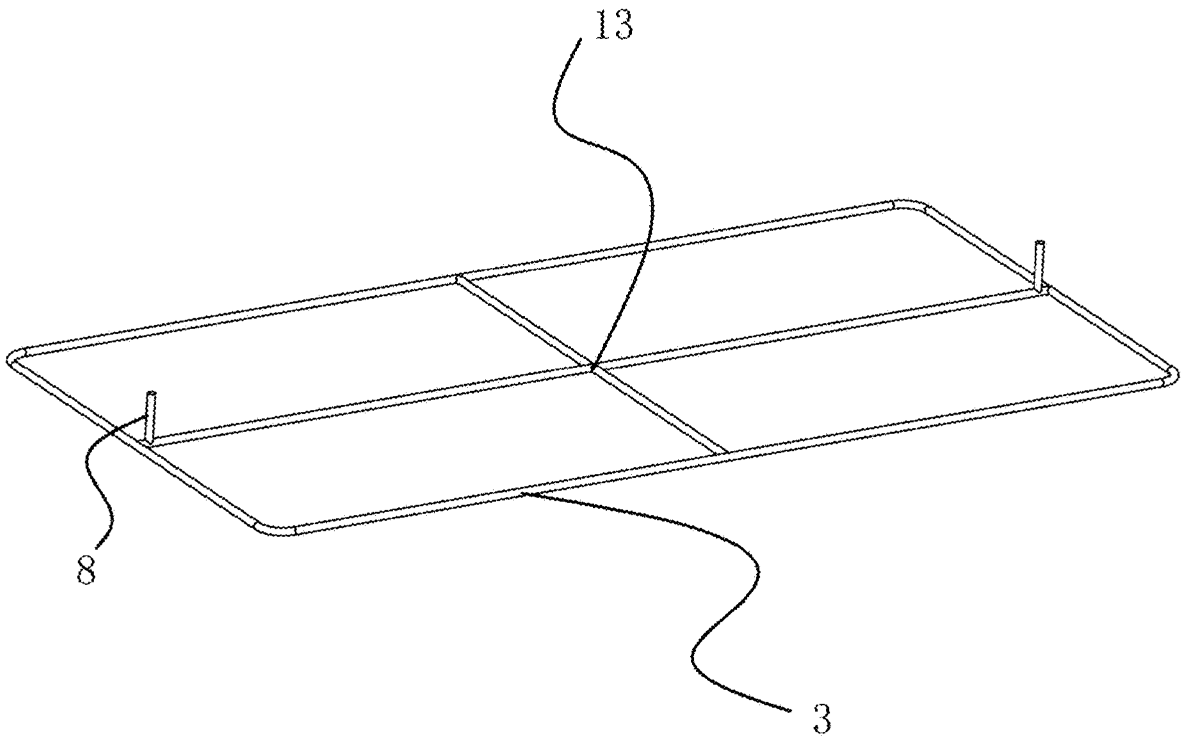
FIG. 5 is a schematic structural diagram of an upper frame.

As shown in FIG. 5, the upper frame 3 further comprises a cross-shaped reinforcing rib 13, four outer ends of the cross-shaped reinforcing rib 13 are respectively connected with side beams of the upper frame 3, and the locking post 8 is vertically fixed on the cross-shaped reinforcing rib 13. The front frame 1 and the rear frame 2 are fixed with straight-bar reinforcing ribs 14 for connecting the side beams. The front frame 1, the rear frame 2 and the upper frame 3 have the same length and width.

The connecting rod is a metal rod, and the first connecting sleeve 5, the second connecting sleeve 6, the third connecting sleeve 7, the fourth connecting sleeve 12, the locking post 8 and the locking sleeve 9 are all made of metal materials. The first connecting sleeve 5, the second connecting sleeve 6, the third connecting sleeve 7, the fourth connecting sleeve 12, the locking post 8 and the locking sleeve 9 are fixed on the connecting rods by welding.

The folding lamp holder for the decorative lamp has a simple structure, the side frames 4 on two sides only need to be bent outward or inward during transportation or storage, then the front frame 1 and the rear frame 2 are close to each other, and then the upper frame 3 is turned outward to lean against the rear frame 2, so that the whole folding lamp holder for the decorative lamp is folded into a flat plate from an original cuboid, the folding lamp holder has a higher strength in a folded state, and the connecting rods are attached together, thus being not easy to be broken or damaged. When the decorative lamp needs to be mounted, the front frame 1 and the rear frame 2 are pulled open, and the side frame 4 is naturally unfolded, after the side frame 4 is pulled flat and straight, the upper frame 3 is turned forward, so that the locking post 8 on the upper frame 3 is inserted into the locking sleeve 9 of the side frame 4, and at this time, the folding lamp holder for the decorative lamp is transformed into a cuboid, then a decoration is wound or pasted on the connecting rod, and a lamp base is fixed in the lamp holder or a lamp string is wound on the connecting rod to complete mounting.

The specific embodiments described herein are only illustrative to the spirit of the present application. Those skilled in the technical field to which the present application belongs may make various modifications or supplements to the specific embodiments described or make substitutions in a similar way, without departing from the spirit of the present application or exceeding the scope defined by the appended claims.

What is claimed is:

1. A folding lamp holder for a decorative lamp, comprising a front frame, a rear frame, an upper frame and a side frame capable of being folded inward or outward, wherein the front frame, the rear frame, the upper frame and the side frame are all composed of connecting rods with circular sections, the front frame, the rear frame and the upper frame are all rectangular, a plurality of first connecting sleeves are fixed on vertical beams on two sides of the front frame in a length direction of the vertical beam, a plurality of second connecting sleeves are fixed on vertical beams on two sides of the rear frame in a length direction of the vertical beam;

a front end of the side frame penetrates through the first connecting sleeve to be rotatably connected to the front frame, a rear end of the side frame penetrates through the second connecting sleeve to be rotatably connected to the rear frame;

a plurality of third connecting sleeves are fixed on an upper end cross beam of the rear frame in a length direction of the upper end cross beam, a cross beam of the upper frame penetrates through the first connecting sleeve to be rotatably connected to the rear frame; and the upper frame is provided with a locking post, an upper end of the side frame is provided with a locking sleeve, and the locking post is capable of being inserted into the locking sleeve after the side frame is unfolded flat.

2. The folding lamp holder for the decorative lamp according to claim 1, wherein the side frame comprises a rectangular front folding frame and a rectangular rear folding frame, a plurality of fourth connecting sleeves are fixed on the front folding frame in a length direction of a vertical beam, and a vertical beam of the rear folding frame penetrates through the fourth connecting sleeve to be rotatably connected to the front folding frame.

3. The folding lamp holder for the decorative lamp according to claim 2, wherein the front folding frame and the rear folding frame have the same length and width.

4. The folding lamp holder for the decorative lamp according to claim 3, wherein the locking sleeve is fixed on one side of the fourth connecting sleeve.

5. The folding lamp holder for the decorative lamp according to claim 1, wherein the upper frame further comprises a cross-shaped reinforcing rib, four outer ends of the cross-shaped reinforcing rib are respectively connected with side beams of the upper frame, and the locking post is vertically fixed on the cross-shaped reinforcing rib.

6. The folding lamp holder for the decorative lamp according to claim 5, wherein the front frame and the rear frame are fixed with straight-bar reinforcing ribs for connecting the side beams.

7. The folding lamp holder for the decorative lamp according to claim 1, wherein the front frame, the rear frame and the upper frame have the same length and width.

8. The folding lamp holder for the decorative lamp according to claim 7, wherein the connecting rod is a metal rod, and the first connecting sleeve, the second connecting sleeve, the third connecting sleeve, the fourth connecting sleeve, the locking post and the locking sleeve are all made of metal materials.

* * * * *